E. H. BRAUER.
WATER TURBINE WHEEL.
APPLICATION FILED APR. 14, 1911.
1,065,208.
Patented June 17, 1913.
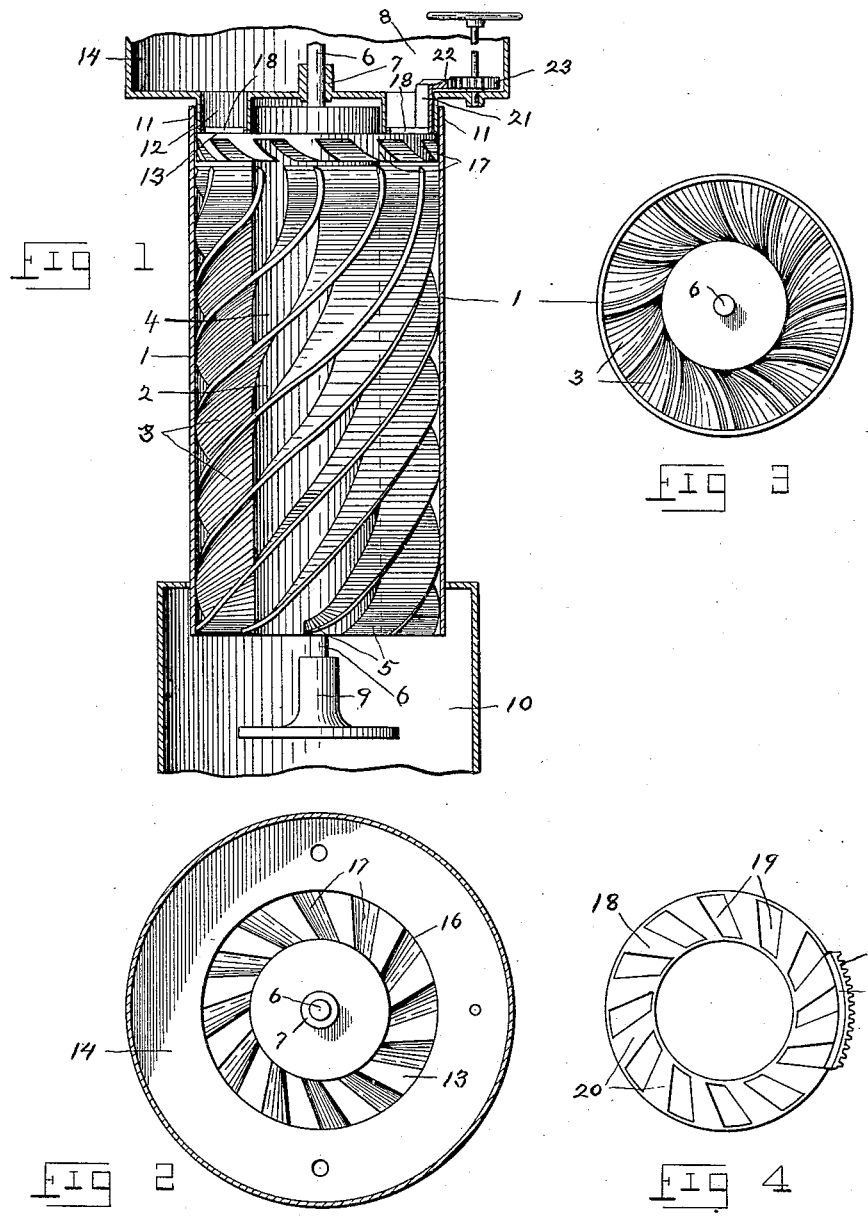
WITNESSES
B. P. Faltin
M. L. Lefevre.
INVENTOR
Ernst H. Brauer,
BY
John J. Thompson
ATTORNEY

UNITED STATES PATENT OFFICE.

ERNST H. BRAUER, OF LANCASTER, PENNSYLVANIA, ASSIGNOR OF FOUR-NINTHS TO CHARLES G. STRICKLER, OF LANCASTER, PENNSYLVANIA.

WATER TURBINE-WHEEL.

1,065,208.  Specification of Letters Patent. Patented June 17, 1913.

Application filed April 14, 1911. Serial No. 621,010.

*To all whom it may concern:*

Be it known that I, ERNST H. BRAUER, a citizen of the United States, residing at Lancaster, in the county of Lancaster and State of Pennsylvania, have invented certain new and useful Improvements in Water Turbine-Wheels, of which the following is a specification, reference being had therein to the accompanying drawing.

This invention relates to a turbine water wheel of that class known as vertical or cylindrical turbines which are mostly employed for high heads of water, but which may, with slight modification, be used with either high or low pressure.

The object of the invention is to provide a wheel of this class so constructed that it will utilize the entire force of the water. Another object of the invention being to provide a wheel of novel form whereby there is no leakage, or loss of power, and no back pressure caused by the water not leaving the wheel freely.

Still another object of the invention is to provide mechanism for directing the water toward the vanes of the wheel to produce the best results; and also means for controlling the water feed.

The device may be used in connection with pulleys, gears or other mechanism for producing power, or the outer cylinder may be employed as the armature of an electric generator to make power direct therefrom.

With these and other objects in view, my invention consists in certain construction and combination of parts as will hereinafter be fully described and claimed in the annexed specification and illustrated in the accompanying drawings, which form a part of this application and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings:—Figure 1, is a vertical view, partly in section, of a turbine water wheel embodying my invention; the flume box or head and lower bearings being simply indicated. Fig. 2, is a top plan view of the lower gate half and water impact guide member. Fig. 3, is a top plan view of the wheel at a point just below said water impact guide member. Fig. 4, is a top plan view of the movable gate member.

As shown in the drawings, the apparatus comprises two concentric cylinders 1, and 2, of different diameters, and having the space between their sides filled by a series of spaced helical blades 3, which have their edges secured to the inner and outer surfaces of said outer and inner cylinders 1, and 2, respectively, and which form a series of helical passages 4, open at the top and bottom; while the lower ends of said blades 3, are slightly curved at 5, to better discharge the water, and at their upper ends curved upward to present an impact surface for the entering water. Said cylinders 1, and 2, are secured on a vertical shaft 6, mounted in an upper bearing 7, here shown in the flume or head box 8 and mounted in the usual way, and a lower bearing 9, in the well 10.

The outer cylinder 1, is provided with an upwardly extending portion 11, which embraces and rotates around a concentric outlet passage 12, formed in the bottom of the head box 8. A ring member 13, is secured to the lower end of the concentric outlet passage 12, and is provided with a series of inclined blades 17, which form between their adjacent sides the chutes 16, thus forming a guide for the water so that it strikes the helical blades 3, at an angle of about ninety degrees, thus producing the most efficient impact; the water thus takes an approximate vertical downward course by gravity through the passages 4, exerting a pressure on the blades 3, all secured to the outer cylinder 1, the centrifugal force will help to give the water a downward force, and no leakage can occur, as would be the case if the blades 3, were not attached to the outer cylinder 1.

For closing off and regulating the supply of water, there is movably mounted in the outlet passage 12, a gate 18, which is formed with a series of openings 19, registering with the chutes 16, when in an open position, and when in a closed position the blank portions 20, cover and close the chutes 16, thus preventing the passage of water.

For operating the gate 18, the same is provided with a flange 21, having a gear rack 22, mounted thereon, which is actuated by a pinion 23, suitably mounted adjacent thereto, and operated in the usual way.

Having thus described my invention what

I claim as new and desire to secure by Letters Patent is:—

The combination with a head-box having a central bearing in its bottom and a concentric outlet passage, of a well having an opening in its upper end and a bearing located therein, a pair of spaced cylinders disposed one within the other and having their ends flush, helical blades disposed between the cylinders and secured thereto, a shaft secured within the inner cylinder and mounted in said bearings, said helical blades terminating below the upper edge of the cylinder, thus producing a channel surrounding the walls of the outlet, a ring disposed at the lower end of said outlet, said ring having openings and inclined chutes leading therefrom, a gate resting upon said ring and having openings for the purpose set forth, a lateral extension upon the ring and engaging one wall of the outlet, a segment upon the extension and resting upon the bottom of the head-box, a pinion engaging the segment and means to actuate it, the helical blades being curved backward at their opposite ends for the purpose set forth.

In testimony whereof I affix my signature in presence of two witnesses.

ERNST H. BRAUER.

Witnesses:
 WM. J. COULTER,
 JOHN J. THOMPSON.

Copies of this patent may be obtained for five cents each, by addressing the "Commissioner of Patents, Washington, D. C."